(12) United States Patent
Ruggeri

(10) Patent No.: US 10,663,063 B2
(45) Date of Patent: May 26, 2020

(54) HYDRODYNAMIC SEAL ASSEMBLY WITH INTERFACE CONTROL

(71) Applicant: Eaton Corporation, Cleveland, OH (US)

(72) Inventor: Edward N. Ruggeri, Westport, MA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/535,850

(22) PCT Filed: Dec. 14, 2015

(86) PCT No.: PCT/US2015/065559
§ 371 (c)(1),
(2) Date: Jun. 14, 2017

(87) PCT Pub. No.: WO2016/100212
PCT Pub. Date: Jun. 23, 2016

(65) Prior Publication Data

US 2017/0370472 A1 Dec. 28, 2017

Related U.S. Application Data

(60) Provisional application No. 62/091,957, filed on Dec. 15, 2014.

(51) Int. Cl.
*F16J 15/34* (2006.01)
*F16J 15/3244* (2016.01)
(Continued)

(52) U.S. Cl.
CPC ....... *F16J 15/3244* (2013.01); *F16J 15/3268* (2013.01); *F16J 15/3272* (2013.01);
(Continued)

(58) Field of Classification Search
CPC ...... F16J 15/34; F16J 15/3436; F16J 15/3452; F16J 15/3464
See application file for complete search history.

(56) References Cited

U.S. PATENT DOCUMENTS 1,797,735 A    3/1931  Spreen
3,582,089 A *  6/1971  Amorese ............. F16J 15/3464
                                                    277/364
(Continued)

FOREIGN PATENT DOCUMENTS

WO    WO-9214080 A1 *  8/1992  ........... F16J 15/3416

OTHER PUBLICATIONS

International Search Report, PCT/US2015/065559, dated Feb. 22, 2016.

*Primary Examiner* — Gilbert Y Lee
(74) *Attorney, Agent, or Firm* — Fishman Stewart PLLC

(57) ABSTRACT

A hydrodynamic seal (10) for use with a rotating shaft (24) is disclosed. The seal includes a face seal (20) and a mating ring (22) fixed or connected to rotate with the shaft. A clamping nut (30) is adjacent to the mating ring and includes threads to secure a portion of the clamping nut to the shaft via a threaded interface (32). Embodiments of the seal and related assembly include at least one of: a spring component (140) with or on the clamping nut; a clamping surface (150) on an interface between the mating ring and the clamping nut, the clamping surface being substantially parallel to a thread pitch on the threaded interface; and a pilot surface (250) on the clamping nut.

16 Claims, 3 Drawing Sheets

(51) Int. Cl.
*F16J 15/3268* (2016.01)
*F16J 15/3272* (2016.01)
*F16J 15/36* (2006.01)

(52) U.S. Cl.
CPC .......... *F16J 15/3416* (2013.01); *F16J 15/36* (2013.01); *F16J 15/3432* (2013.01); *F16J 15/3452* (2013.01)

(56) References Cited

U.S. PATENT DOCUMENTS

| | | | | |
|---|---|---|---|---|
| 3,588,128 | A * | 6/1971 | Petersen | F16J 15/3436 277/384 |
| 4,509,762 | A * | 4/1985 | Garrett | F16J 15/3464 277/372 |
| 5,700,013 | A * | 12/1997 | Baty | F16J 15/025 277/340 |
| 6,142,476 | A * | 11/2000 | Iwane | F16J 15/3464 277/358 |
| 9,359,912 | B2 * | 6/2016 | Ullah | F01D 11/003 |
| 2002/0074728 | A1 * | 6/2002 | Kraus | F16J 15/3452 277/353 |
| 2014/0049010 | A1 * | 2/2014 | Jahn | F16J 15/30 277/522 |

\* cited by examiner

HYDRODYNAMIC SEAL ASSEMBLY WITH INTERFACE CONTROL

CROSS-REFERENCE TO RELATED APPLICATIONS

This application claims priority to International Patent Application No. PCT/US2015/06559, filed Dec. 14, 2017, which claims the benefit to U.S. Provisional Application Ser. No. 62/091,957, filed Dec. 14, 2014, the contents of both are incorporated by reference in their entireties.

TECHNICAL FIELD

The present disclosure relates to a hydrodynamic seal assembly with interface control, including assemblies and installations with a clamping nut.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

As more customers in the aircraft industry require extended maintenance service intervals, manufacturers and suppliers have been converting many sealing applications to hydrodynamic sealing technology. Historically, standard service intervals were roughly 10,000 hours. However, some recent requirements have been as high as 40,000 hours, or more. Higher service intervals typically require sealing reliability to be significantly increased, which has led to increasing interest in hydrodynamic sealing technology.

Hydrodynamic seals generally include a seal assembly or face seal, and a rotor or mating ring. The seal components operate on a hydrodynamic air film during normal operation and generally operate in the contact mode only during start-up and shutdown. To be effective, hydrodynamic seals typically involve precise control of the sealing surfaces—i.e., a seal face on a face seal and on a mating ring.

Mating rings are often attached to a shaft, which is a rotating element. It is common design practice to allow for a slip fit between the mating ring and rotating shaft. The mating ring may be positioned in such a way that the clamping load is applied through the adjacent components and into the mating ring. The surfaces on adjacent components can influence the sealing surface of the mating ring. These adjacent component surfaces, commonly referred to as interface control surfaces, are generally controlled through tolerancing or geometric features.

In assemblies in which a clamping nut is an adjacent component providing clamping force or load against a mating ring, the sealing surface of the mating ring may become distorted, since the primary guide of the clamping nut will be the threads of the clamping nut. However, in instances, the threads on the clamping nut may not provide a sufficient precision guide for applying a desired clamping load to a corresponding mating ring.

With the design of a hydrodynamic mating ring and assembly, a great deal of analysis may be involved to better ensure the appropriate coning of the sealing surface once the hydrodynamic mating ring is installed. The analysis can involve a number of assumptions as to the coning value, particularly in instances in which a clamping nut is in direct contact with a hydrodynamic rotor. With such instances, the coning values may vary greatly.

There is therefore a desire for solutions/options that better control clamping surfaces or interfaces, and/or minimize or eliminate one or more of the above-described challenges. The foregoing discussion is intended only to illustrate the present field and should not be taken as a disavowal of scope.

SUMMARY

A hydrodynamic seal for use with a rotating shaft and related assembly are described. The seal includes a face seal and a mating ring fixed or connected to rotate with the shaft. A clamping nut may be provided adjacent to the mating ring and may include threads to secure a portion of the clamping nut to the shaft via a threaded interface. Embodiments of the seal and related assembly include one or more of the following: a spring component with or on the clamping nut; a clamping surface on an interface between the mating ring and the clamping nut, the clamping surface substantially parallel to a thread pitch on the threaded interface; and/or a pilot surface on the clamping nut.

The foregoing and other aspects, features, details, utilities, and advantages of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention.

Figure 1:
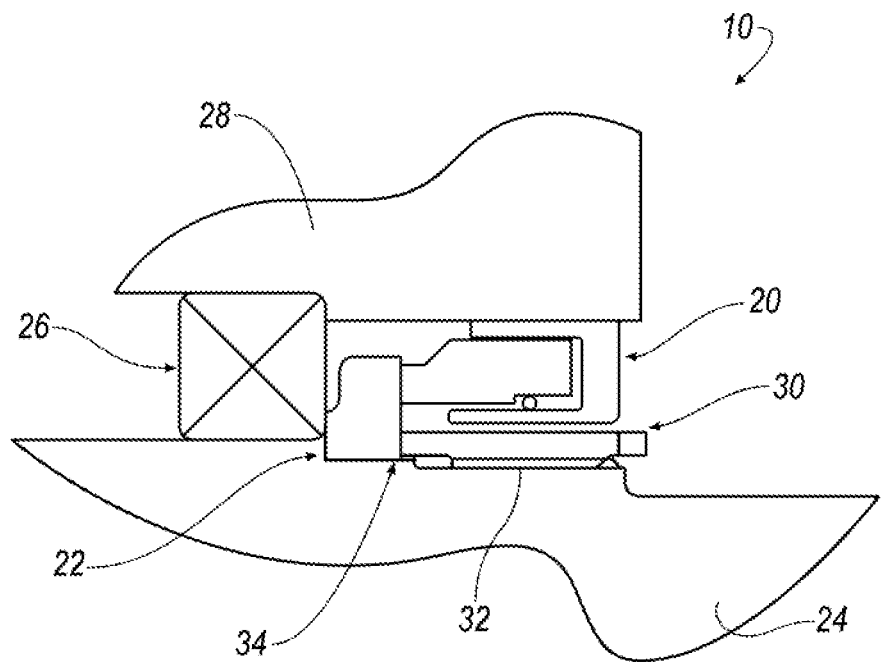
FIG. 1 is a cross-sectional illustration of a conventional seal assembly/installation with a clamping nut shown adjacent to a mating ring.

Referring now to the drawings, which are not intended to limit the invention, FIG. 1 generally illustrates a conventional face seal assembly/installation 10 having a face seal 20 that contacts a rotor or mating ring 22. Mating ring 22 is attached to a shaft 24, which is a rotating element. As shown in the illustrated embodiment, the shaft 24 may rotate on a bearing 26, which may be secured in or by a housing 28. At least one of the face seal 20 and mating ring 22 may include a hydrodynamic element or feature, which may cause or induce the seal components 20, 22 to operate on a hydrodynamic air film during normal operation. In some embodiments, both seal components 20, 22 may include a hydrodynamic element or feature. Such hydrodynamic element or feature may include, without limitation, inlet portions, grooves, and/or scooping formations, which may be configured to create a higher pressure than a surrounding pressure. Such hydrodynamic elements or features may, for example, include elements and features known in the art, including, without limitation, elements and features disclosed in U.S. patent application Ser. No. 12/345,743, filed Dec. 30, 2008, and U.S. patent application Ser. No. 14/128,101, filed Jul. 12, 2012, which are incorporated herein by reference. As such, the face seal 20 and mating ring 22 may essentially contact only during a predetermined or permitted rotational speed (including no rotation) of the shaft 24, such as during start-up and shutdown of the machine into which they are installed.

As generally illustrated, a seal assembly/installation 10 may also include a clamp or clamping nut 30 (which may also be referred to as a "clamp nut") that may be threaded onto the shaft 24 via a threaded interface 32. In the described installation, a sealing surface or clamp interface 34 of the mating ring 22 may become distorted, even significantly distorted, since the primary guide of the clamping nut 30 is the threaded interface 32. Threads on the clamping nut 30 may not provide a sufficient precision guide for applying clamping load to the hydrodynamic mating ring 22. Such distortion can, in instances, have an adverse impact on the hydrodynamic performance of the seal assembly/installation 10.

Figure 2:
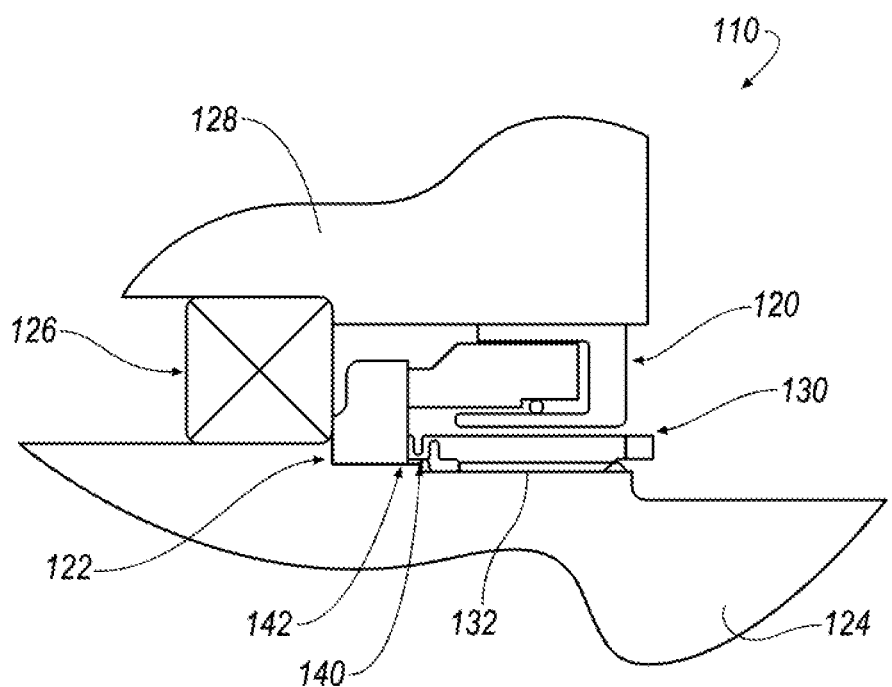
FIG. 2 is a cross-sectional illustration of an embodiment of a seal assembly/installation illustrating aspects and teachings of the present disclosure, including a clamping nut configured to provide a clamp load around a mating ring.

Referring to FIG. 2, an embodiment of a seal assembly/installation 110 that generally illustrates aspects and teachings of the present disclosure is shown. It is noted that several components associated with seal assembly/installation 110 may be similar to those shown in connection with seal assembly/installation 10. However, among other distinctions, a clamping nut 130, such as generally illustrated in FIG. 2, may include a spring component 140 (which may also be referred to as a "spring"). In embodiments, such as generally illustrated, the spring component 140 may be formed integrally with the clamping nut 130, and may generally provide an integral or "built-in" spring effect to help control clamping load. However, in other embodiments a spring component may be connected or attached to a clamping nut to form a relevant component.

In embodiments, spring component 140 may be configured to, inter alia, substantially equalize a clamping force around a clamp interface 142—such as provided between a clamping nut 130 and a mating ring 122. For example, spring component may provide a uniform, or substantially uniform, clamping force around a clamp interface 142. That is, in embodiments, the spring component 140 may provide, among other things, a more uniform clamp load around a mating ring. It is also noted that the location of the spring component may be varied from that illustrated. That is, the spring component 140 can be positioned such that it provides additional influence of coning, either positive or negative, to the sealing surface. For example, in the illustrated embodiment, the spring component 140 is located proximate a distal end of clamping nut 130. However, the location of the spring component is not intended to be limited to the illustrated location, and, if desired, an extended or separate offset spring component could be included.

Figure 3A:
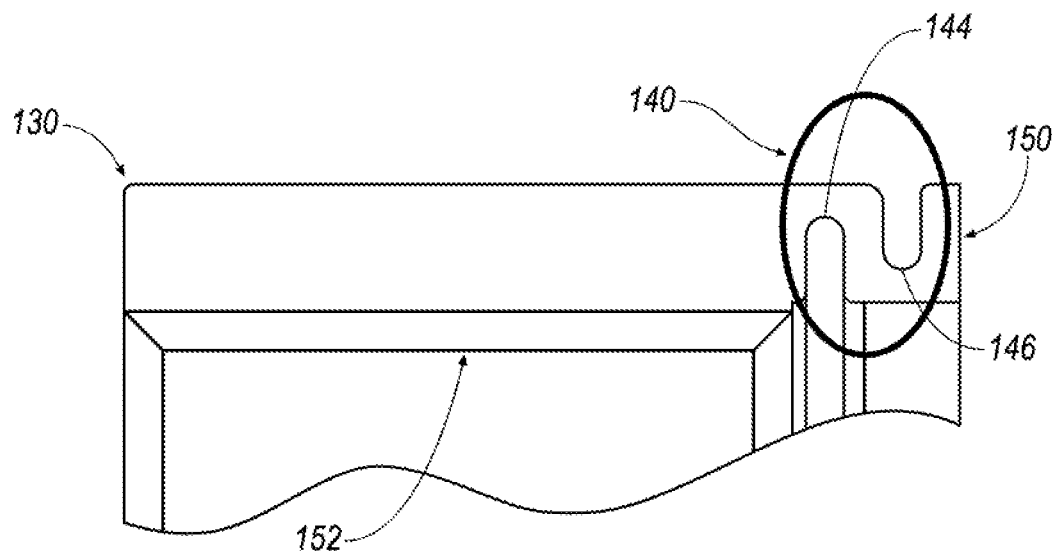
FIG. 3A is a partial cross-sectional view of an embodiment of a clamping nut, illustrating aspects and teachings of the present disclosure.
Figure 3B:
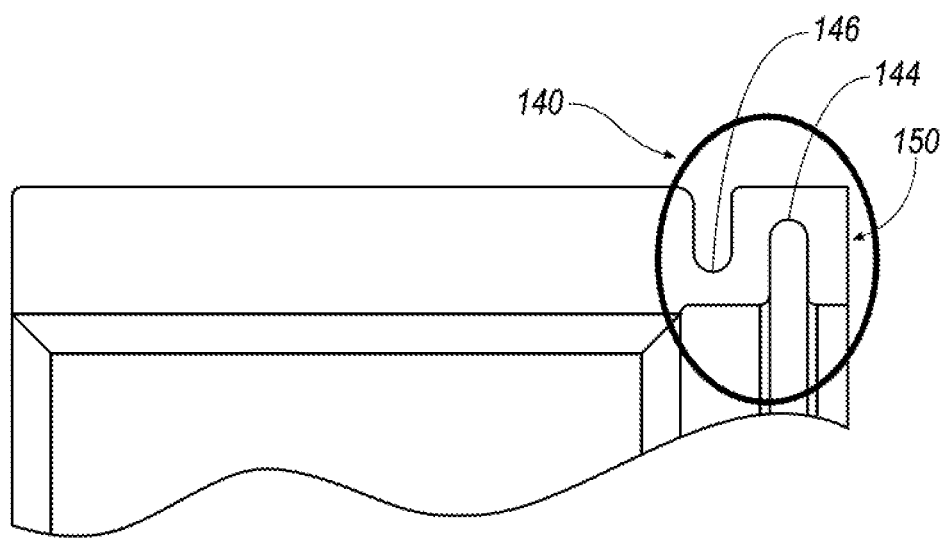
FIG. 3B is a partial cross-sectional view of another embodiment of a clamping nut, illustrating aspects and teachings of the present disclosure.

In an embodiment, such as generally shown in FIG. 3A, a spring component 140 may, for example, include a radially outward extending groove 144 and a radially inwardly extending groove 146, which together may result in a generally S-shaped configuration. Such a configuration may permit the spring component 140 to deflect and/or compress as the clamping nut 130 is torqued onto a shaft 124. Such a configuration can help avoid "point" loading and uneven coning and waviness, and may help isolate distorting influences of the clamping nut 130 on the mating ring 122. In applications, control of coning to within millionths of inches can be important, making control of distributed loading a significant factor. As will be appreciated, the configuration of the grooves 144, 146 in spring component 140 may be alternated or reversed, such as for example as generally illustrated in FIG. 3B. As will be further appreciated, spring component 140 is not limited to the use of two alternately-facing grooves as illustrated, and other configurations that involve a different number, size, shape, or configuration of grooves, and/or impart some isolating effect and more uniform control of clamp load, may be substituted or additionally employed.

In addition to or in lieu of a spring component 140, a geometric relationship between a thread pitch and a clamping interface surface on either or both of the clamping nut 130 and mating ring 122 may be employed and controlled. In instances in which thread pitch is not particularly fine (such as to the level of Class 6 threading), such geometric control can better implement or effectuate circumferential contact of the clamping interface between a clamping nut 130 and a mating ring 122, which may allow for more uniformly distributed forces around this circumference. For example, in the embodiment generally illustrated in FIG. 3A, a clamp surface 150 on the clamping nut 130 may be manufactured (e.g., machined) so as to be substantially parallel to a thread pitch on threads 152 of the clamping nut 130. With such a coordinated configuration, the substantially parallel nature between the clamp surface 150 and the thread pitch of the threads 152 can controlled to better effectuate simultaneous circumferential contact. This can provide a load distribution improvement with respect to some conventional arrangements that involving angled threads, as with the angled threads the load nut can change direction as it is loaded.

Figure 4:
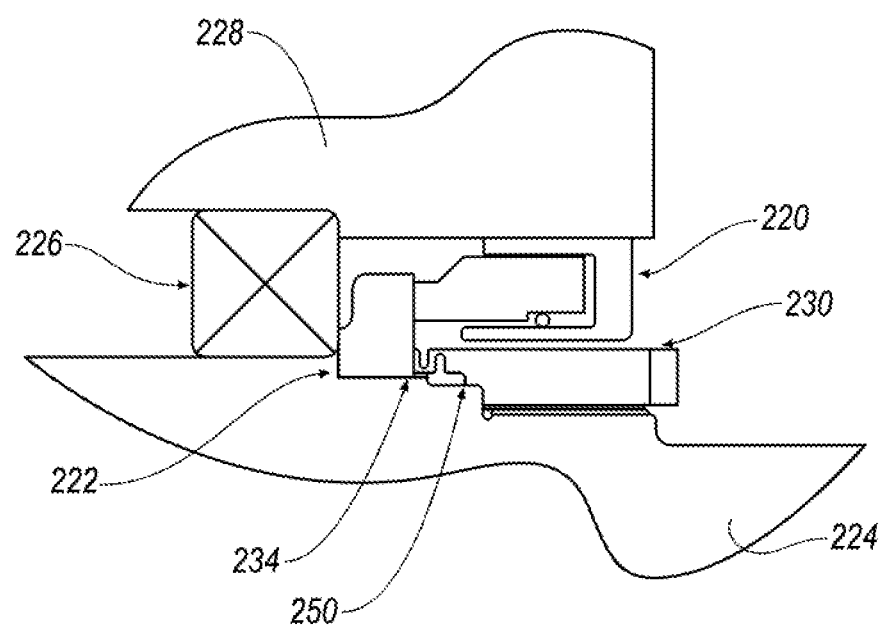
FIG. 4 is a cross-sectional illustration of an embodiment of a seal assembly/installation to aspects and teachings of the present disclosure.

Referring to FIG. 4, another embodiment of an assembly/installation is shown that is similar to the assembly/installation illustrated in FIG. 2. In this illustrated embodiment, a clamping nut 230 includes a pilot surface, generally illustrated as pilot surface 250 in FIG. 4, which can help to isolate threads and a thread pitch effect on distortion transmission with respect to a mating surface, e.g., mating ring 222. Among other things, the inclusion of a pilot feature can help prevent radial shift along an axis of a shaft, and can help provide more uniform control of the clamping surface. It is also noted that the pilot surface could be provided on or in connection with a separate/intermediate component—e.g., a stack adapter—that is included with the assembly/installation.

Among other things, the various concepts disclosed herein may isolate the influence of the threads on a clamping nut in applying a clamping load for hydrodynamic rotor applications or sealing applications where improved sealing surface control is required. It is noted that while certain aspects and teachings have been mentioned with respect to different embodiments, certain features may be used in selective combination on a single assembly/installation as may be desirable.

The invention has been described in detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A seal assembly, comprising:
   a shaft;
   a face seal;
   a mating ring fixed or connected to rotate with the shaft; and
   a clamping nut including a spring component;
   wherein the clamping nut is provided adjacent to the mating ring, a portion of the clamping nut engages or is secured to the shaft via threads; and the clamping nut provides a clamp load around a portion of the mating ring via contact with an end of the spring component; and
   wherein the spring component includes a radially outward extending annular groove and a radially inward extending annular groove.

2. The seal assembly of claim 1, wherein the face seal includes a hydrodynamic element or feature.

3. The seal assembly of claim 1, wherein the mating ring includes a hydrodynamic element or feature.

4. The seal assembly of claim 1, wherein the spring component is formed as an integral portion of the clamping nut.

5. The seal assembly of claim 4, wherein the spring component and the clamping nut are formed from a singular material.

6. The seal assembly of claim 1, wherein the spring component is connected or attached to the clamping nut.

7. The seal assembly of claim 1, wherein the spring component is configured to provide a substantially uniform clamping force around a clamp interface between the clamping nut and the mating ring.

8. The seal assembly of claim 1, wherein the spring component is provided proximate a distal end of the clamping nut.

9. The seal assembly of claim 1, wherein the radially inward extending groove and the radially outward extending groove provide a generally S-shaped configuration.

10. The seal assembly of claim 1, wherein a clamping surface on an interface between the mating ring and the clamping nut is substantially parallel to a thread pitch on the threads to provide a threaded interface with the shaft.

11. The seal assembly of claim 1, wherein the clamping nut includes a pilot surface.

12. The seal assembly of claim 11, wherein the pilot surface is configured to prevent radial shift along an axis of the shaft.

13. A seal assembly, comprising:
    a shaft;
    a face seal;
    a mating ring fixed or connected to rotate with the shaft; and
    a clamping nut including at least one radially extending groove at an axial end of the clamping nut adjacent to the mating ring, the clamping nut being made from a singular material;
    wherein a portion of the clamping nut engages or is secured to the shaft via a threaded interface; the clamping nut provides a clamp load around a portion of the mating ring; and a clamping surface on an interface between the mating ring and the clamping nut is substantially parallel to a thread pitch of the threaded interface.

14. The seal assembly of claim 13, wherein the clamping nut includes a pilot surface.

15. A seal assembly for use with a rotating shaft, the seal assembly comprising:
    a face seal;
    a mating ring fixed or connected to rotate with said shaft; and
    a clamping nut adjacent to the mating ring, the clamping nut including threads and configured to be secured to said shaft via a threaded interface, the clamping nut configured to provide a clamp load around a portion of the mating ring; and
    a spring component with or on the clamping nut and having an S-shaped configuration, the spring component include at least one radially extending annular groove.

16. The seal assembly of claim 15, further comprising at least one of (i) a clamping surface on an interface between the mating ring and the clamping nut, the clamping surface substantially parallel to a thread pitch on the threaded interface, and (ii) a pilot surface on the clamping nut.

\* \* \* \* \*